Patented Jan. 10, 1950

2,493,963

UNITED STATES PATENT OFFICE 2,493,963

ELECTROLYTIC RECORDING

Harold G. Greig, Princeton, N. J., assignor to Radio Corporation of America, a corporation of Delaware No Drawing. Original application October 14, 1944, Serial No. 558,717. Divided and this application November 4, 1944, Serial No. 562,033

2 Claims. (Cl. 204—2)

The present invention relates to the electrolytic production of color images on a traveling web or band (which, for simplification, may be called a carrier) and particularly to the production of such images in facsimile recording while employing as a component for the production of the images a tetrazonium compound stabilized by means of an alkylolamine.

This application is a division of my copending application, Serial No. 558,717, filed October 14, 1944, entitled "Electrolytic recording," now U. S. P. 2,459,521, dated January 18, 1949.

Solomon in U. S. P. 2,306,471 discloses the electrolytic production of color images on a carrier by a number of methods, the most efficacious of which involves the electrolytic diazotization of a primary aromatic amine and the electrolytic coupling of the so-formed diazonium compound with a coupling compound. While very good records are obtained by this method, the records do not represent the optimum in these two very important aspects:

(1) Shade and depth of color of the images, and (2) Background permanence of the records to light.

The azo dyes which give the best records are dark blue, green and black dyes. While there are many components employed in the manufacture of azo dyestuffs which yield yellow, orange and red dyes, there are not so many components which give dyes simulating a black shade. The monoazo dyes which possess such shades are metal complexes of the dyestuff, usually with a metal such as chromium. The other dyes having such shade are trisazo dyes. The difficulties of introducing a metal into a preformed dye serving as an image record with the production of a modified record, are self-evident. Attempts to produce satisfactory records in this way met with little or no success.

It is of course possible to produce a record of a trisazo dye by starting with a receiver which is dyed with a monoazo dye and by effecting the formation of the trisazo dye under the printer bar. This, however, means that the receiver is originally dyed, making it difficult and complex to handle the receiver prior to its use.

There are certain primary amines which upon diazotization and coupling yield deep blue dyes. Primary amines of this character are benzidine, dianisidine and the like. These compounds, however, are insoluble in water and hence cannot be used in the electrolytic diazotization and coupling method.

It has been found that with the electrolytic diazotization and coupling method, the impermanence of the background is attributable to three possible factors. The first of these involves the spontaneous formation of the dyestuff of which the record is composed. The coloring produced in this way, however, is dischargeable by alkaline sodium hydrosulfite solution. Another possibility involves oxidation of the coupler. The color thus produced also appears to be dischargeable. The third factor involves oxidation and polymerization and the color produced in this way is not dischargeable.

It has been ascertained that coloring produced by the last of these methods is enhanced by primary aromatic amino groups, particularly when these are present in the coupling component. Attempts to modify these groups or to modify the structure of the various couplers used in the electrolytic diazotization and coupling method so as to avoid this latter type of coloration have given some improvement but have not completely alleviated the condition.

It has now been discovered that the disadvantages inherent in the utilization of the electrolytic diazotization and coupling method can be avoided by electrolytically producing the color images while employing a tetrazonium compound e. g. benzidine or dianisidine stabilized by means of an alkylolamine.

It is accordingly an object of this invention to produce dyestuffs by reacting under the influence of an electrolytic current a coupling compound and tetrazotized benzidine or -dianisidine stabilized with an alkylolamine.

It is a further object of this invention to electrolytically produce azo dyestuff records which are of a dark shade simulating black and which have improved background stability.

Other and further objects of my invention will be apparent as the description proceeds.

Stabilized diazoamino compounds may be formulistically represented as follows:

wherein A is an aryl radical and X is a radical of an aliphatic amine the amino nitrogen atom of which is linked to the azo group. When these compounds are subjected to the action of an electrolytic current, the compounds are split along the dotted line indicated in the formula. The diazonium compound which has thus been regenerated is now capable of reacting with a coupling compound of the type usual in the formation of azo dyestuffs to give a dyestuff.

The diazoamino compounds falling within the above general classification and which are suitable for use in my process are those obtained by reacting an alkylolamine such as ethanolamine, diethanolamine or di-isopropanolamine with tetrazotized benzidine or -dianisidine.

Examples of such diazoamino compounds are the following:

1 mol of tetrazotized dianisidine+2 moles of diethanolamine 1 mol of tetrazotized benzidine+2 moles of diethanolamine.

These diazoamino compounds are employed with any of the couplers usual in the manufacture of azo dyestuffs. A list of couplers which may be employed are, for instance, disclosed in Solomon U. S. P. 2,306,471. It is to be borne in mind, however, that certain couplers give better results than others, and this is particularly true with regard to chromotropic acid. Other couplers by which very satisfactory records can be obtained are:

p-Sulfo-phenyl methyl pyrazolone
H acid
Phenyl I acid
Chloro H acid
1-naphthol-4,8-disulfonic acid
Acetyl H acid
Naphthol AS
Beta naphthol
Naphthol RF
Ethylated beta naphthol
A mixture of chromotropic acid and diacetoacetyl ethylene diamine.

Of these various couplers, chromotropic acid has been found to give records which excel from the standpoint of darkness of shade and background permanence and the chromotropic acid is therefore preferred.

The diazoamino compounds are prepared by tetrazotizing benzidine or dianisidine and reacting one of the aforesaid alkylolamines therewith in an alkaline solution. It has been found that the relative proportions of the amine acting as a stabilizer to the tetrazonium compound is of marked significance. In any case, it is necessary to use an excess of the stabilizing amine over the quantity theoretically required to produce the diazoamino compound. Preferably there should be used an amount of the stabilizing amine ranging up to 0.5 per cent excess of theory. If the amount of the stabilizing amine exceeds the proportions given, the sensitivity of the recording solution is thereby substantially depressed. It is therefore advisable to bear these ratios in mind in compounding the diazoamino compound.

One of the particular advantages in the utilization of the above stabilized diazoamino compounds is that they may be utilized in the form of water-insoluble compounds. Previously, stress has been placed upon the fact that compounds such as benzidine, dianisidine, and the like are primary aromatic amines which upon diazotization and coupling yield dyestuffs simulating shades of black. The utilization of these diazoamino compounds, therefore, permits the electrolytic recording method to be expanded to include the utilization of those normally water-insoluble primary aromatic amines which have been found to yield the darkest shades of dyestuffs.

The essential components for the electrolytic process are the stabilized diazoamino compound, the coupler, and an electrolyte in water solution or other dissociating solvent solution, such as alcohol. The composition containing one or more of these essential ingredients is rendered alkaline so as to have a pH ranging between 7.5 and 11.5. The alkalinity can be effected by the utilization of inorganic hydroxides, such as sodium hydroxide, potassium hydroxide, or the like.

Other ingredients may also be employed to facilitate the operation. Thus penetration of the receiver by the recording composition is facilitated by the use of a wetting agent such as alkyl naphthalene sulfonic acids, for example butyl naphthalene sulfonate and the like, the condensation product of a sulfonated benzene with chlorinated kerosene, sarcosines and taurines, the N-atom of which is acylated with a high molecular weight fatty acid fo rexample oleic, palmitic and the like.

Improved half tones are ensured by using a buffering agent in the recording composition. The buffering agent may be borax, sodium acetate, sodium carbonate or the like.

Where a question of stability is involved this can often be resolved by resorting to the use of reducing agents such as hydrazine, hydroxylamine and the like. While the reagents enumerated above are not essential, they will in some instances lead to an improved process and the formation of improved images, and their use in general is recommended.

The receiver may be prepared for the electrolytic treatment in various ways. Thus, the receiver may be impregnated with an organic solvent solution of the water-insoluble diazoamino compound, such as an alcohol solution, and the receiver subjected to an electric current in an electrolyte solution containing the coupler. Furthermore, a paste may be made of the components, the paste applied to the receiver, and the receiver subjected to electrolysis in an electrolyte solution. The invention contemplates the utilization of any method for bringing a receiver under the influence of an electrolytic current in the presence of a diazoamino compound, as above, an electrolyte and a coupling compound so as to effect a springing of the diazonium compound from the diazoamino compound and a coupling of the same with the coupling compound to produce dye images in consonance with the impulses imposed upon the electrolytic cell.

It is known in the dyestuff art to utilize diazoamino compounds for the preparation of azo dyestuffs. These compounds are used in the dyestuff art in one of two methods. In the first method, fabrics and the like are uniformly dyed by impregnating the fabric with the diazoamino compound and regenerating the diazonium compound in the presence of a coupling compound. The second method involves printing a design on a fabric with a paste containing the diazoamino compound and a coupling compound and regenerating the diazonium compound by an after-development procedure. The diazonium compound is regenerated for coupling in these methods by resorting to the utilization of steam, acid vapors, strong acids and the like.

There is, however, a very marked distinction between the procedure adopted for use in the dyestuff art and the course of the reaction in my present electrolytic recording method. In the dyestuff art the whole fabric is permeated with the decomposing agent and should this be acid the entire fabric becomes acidic and remains so until the acidity is neutralized by the utilization of an alkali. In other words, the acidity is permanent rather than fugitive. The degree of acidity is uniform throughout. Consequently, if the fabric is uniformly impregnated with the diazonium compound, upon treatment of the fabric with a coupler and the decomposing agent the fabric will be uniformly dyed throughout.

In the electrolytic method, on the other hand, the color is developed only on one surface of the received. Thus if the receiver is a fabric when the electrolyzing current flows through the fabric between the electrodes, only a very small part of the receiver, i. e., that which is in direct contact with the surface of the printer bar (anode) and which is backed by the helix (cathode) becomes acidic. The reverse side of the fabric becomes more alkaline. This condition, however, is only transitory for as soon as the current flow ceases the acidity is lost completely and alkalinity is automatically restored. The time of the current flow for any one particular spot is eceedingly small, being less than 1/10000 of a second for normal recording speeds. The degree of acidity is variable being dependent on the current and the time of flow, and this mechanism thus permits a gradation in the amount of color formed, whereby the production of half tones is made possible. Such procedure is impossible in the dyestuff art since a gradation in the amount of color can only be effected in that method by limiting the amount of the diazoamino compound or coupler in the fabric and cannot be effected by control of acid development of the color.

There are other factors existing which also serve to distinguish the electrolytic method, on the one hand, from the prior art dyestuff method, on the other hand. The degree and permanence of acidity in the electrolytic method, as previously pointed out, is not comparable to the degree and permanence of acidity in the prior art method. Whether it is the acidity which prevails at the anode in the electrolytic method by which decomposition of the diazoamino compound results is not known and has not been ascertained. It is known, however, that during electrolysis a strong oxidizing action is present. This oxidizig action probably plays some part in the breaking of the diazoamino compound since the art recognizes the fact that many organic linkages are broken by the action of strong oxidizing agents.

Furthermore, during electrolysis nascent chlorine and oxygen are present so that in addition to the formation of the dye by coupling, side reactions undoubtedly ensue. These other reactions influence the course of the reaction, particularly with regard to the shade of the color formed. It is thus evident that the procedure herein contemplated cannot be considered even analogous to the prior art procedure of producing azo dyestuff from coupling compounds and stable diazoamino compounds.

Considerable attention has been paid above to the various types of coloring which produce background impermanence in electrolytic recording. It was stated that the coloring apparently attributable to oxidation and polymerization of the coupling compound is facilitated when there is present in the electrolyte a component having a primary aromatic amino group. Very surprisingly, however, the above diazoamino compounds which are per se stable to light, exert a stabilizing action to light upon the coupler precluding to a far-reaching extent the aforesaid discoloration attributable to oxidation and polymerization. This, of course, means that after the electrolytic treatment the records obtained are much more permanent in their background on exposure to light than the records obtained by other electrolytic methods. An indication of the degree to which the above diazoamino compounds affect background stability may be seen from the fact that records made with the best solutions for the electrolytic diazotization type recording showed more discoloration when exposed to light for one day than records made according to the present method and exposed to light for one month. These diazoamino compounds, therefore, have some very peculiar action on the coupling agents which leads to high light stability of the records, a fact which could never have been deduced from the nonanalogous employment of the diazoamino compounds in the dyestuff art in general.

The following examples will serve to illustrate my invention, although it is to be understood that the invention is not restricted thereto.

*Example I*

24.4 grams of dianisidine are slurried in
40 cc. of 38% hydrochloric acid and after being thoroughly wetted out, approximately 500 grams of water and
500 grams of ice are added thereto.

13.8 grams of sodium nitrite are dissolved in a small amount of water and the solution is run into the slurry at a temperature of 10 to 15° C. An excess of nitrous acid is maintained for half an hour and then is removed by the addition of a small amount of sulfamic acid. This procedure can be followed by spot tests on starch-iodide paper.

10 grams of activated charcoal are then added and the solution stirred for 15 minutes. The solution is then filtered.

The tetrazotized dianisidine thus obtained is then added slowly to a solution of 24 grams of diethanolamine and 36.8 grams of soda ash in 600 parts of water while rapidly agitating. A reaction temperature of 10 to 15° C. is maintained. The soda ash is added as required in small amounts throughout this addition to maintain slight alkalinity, as shown by test with brillian yellow test solution. When the reaction is complete, which will require about half an hour, the insoluble diazoamino compound is isolated by filtration. The filter cake is dried at 65 to 70° C. and is then ready for utilization in the formation of the sensitive recording paper.

The diazoamino compound thus prepared is insoluble in water. For sensitizing the receiver, a solution of the diazoamino compound is made in ethyl alcohol and the receiver treated therewith either by immersion or by spraying. A recording solution for use with the treated paper is then made up by dissolving .015 gram mol of chromotropic acid and 30 grams of salt, in a liter of water. Sufficient sodium hydroxide is added to the solution to give it an effective pH of 10.2. The solution is then used for wetting the paper, whereupon the paper is used in an electrolytic recording apparatus for the formation of dyestuff images thereon.

The dyestuff images obtained are dark blue brilliant images on a yellow background. The background is highly resistant to color changes.

Similar results were obtained when utilizing in lieu of the chromotropic acid coupler, the following couplers:

p-Sulfophenylmethyl pyrazolone
    H-acid
    Phenyl I acid
    Chloro H acid
    1-naphthol-4.8-disulfonic acid
    Acetyl H acid
    Beta naphthol
    Naphthol RF
    Ethylated beta naphthol and a mixture of chromotropic acid and diacetoacetyl ethylene diamine.

*Example II*

2.4 grams of naphthol As are mixed with
1.28 grams of sodium hydroxide (in the form of a concentrated solution) and
20 cc. of boiling water are poured over the mixture to give a color suspension. After cooling to room temperature,
2 grams of a 40% solution of formaldehyde are added and the mixture diluted to a volume of 100 cc.

Recording paper is treated by immersion in the above composition. The paper is then coated with a paste made by mixing the dry diazoamino compound of Example I with sufficient diethanolamine to give the desired consistency.

This paper is then passed through a slightly alkaline solution of salt and water and subjected to the action of an electrolytic current. There are formed on the paper, dyestuff images which are dark blue to purple in color on a yellow background. The records show a high background stability to light.

It will be appreciated that in this example both the diazoamino compound and the coupler are water-insoluble, but despite this fact, very satisfactory records are nevertheless obtained.

*Example III*

The procedure in this example is the same as in Example I excepting that the diazonium compound which is stabilized is tetrazotized benzidine.

It is to be understood that various modifications of my invention will be apparent to persons skilled in the art and I therefore do not intend to be limited in the patent granted except as required by the appended claims.

I claim:

1. The process of producing dark colored images on a relatively stable background and on only one side of a fibrous traveling carrier by the electrolytic facsimile recording method which comprises subjecting to the action of an electrolytic recording current such a fibrous traveling carrier which has been impregnated with an alkaline azo dye forming composition comprising as its essential components a water soluble inorganic salt as the electrolyte in an amount to facilitate the passage of the electrolytic recording current, a diazoamino compound produced by reacting a compound selected from the class consisting of tetrazotized benzidine and tetrazotized dianisidine with an alkylolamine selected from the class consisting of ethanolamine, diethanolamine, and di-isopropanolamine, said diazoamino compound being stable to light and air oxidation in an alkaline medium and splitting under the influence of the electrolytic recording current to yield diazonium ions, and a sufficient quantity of a coupling component to react with said diazonium ions when formed to produce an azo dye.

2. The process of producing dark colored images on a relatively stable background and on only one side of a fibrous traveling carrier by the electrolytic facsimile recording method which comprises impregnating the carrier with an alcoholic solution of the diazoamino compound from tetrazotized dianisidine and diethanolamine, said diazoamino compound being split under the influence of the electrolytic recording current to yield diazonium ions, subsequently impregnating the carrier with an aqueous alkaline solution containing as its essential component sodium chloride in an amount to facilitate the passage of the electrolytic recording current and chromotropic acid in an amount sufficient to react with said diazonium ions when formed to produce an azo dye, and subjecting the so treated carrier to the action of an electrolytic recording current.

HAROLD G. GREIG.

REFERENCES CITED

The following references are of record in the file of this patent:

UNITED STATES PATENTS

| Number | Name | Date |
|---|---|---|
| 1,970,539 | Bausch | Aug. 21, 1934 |
| 2,078,388 | Kern | Apr. 27, 1937 |
| 2,232,405 | Schmelzer | Feb. 18, 1941 |
| 2,232,406 | Schmelzer | Feb. 18, 1941 |
| 2,306,471 | Solomon | Dec. 29, 1942 |
| 2,419,296 | Solomon | Apr. 22, 1947 |
| 2,421,367 | Solomon | May 27, 1947 |
| 2,459,521 | Grieg | Jan. 18, 1949 |

OTHER REFERENCES

The Aromatic Diazo-Compounds and Their Technical Applications, by K. H. Saunders, 1936, pages 30, 31, 128, 129, 130, 134, 135, 136, 137.